United States Patent [19]

Satava

[11] 4,142,923

[45] Mar. 6, 1979

[54] METHOD OF INDUCTION HEAT TREATING, QUENCHING AND TEMPERING, OF STRUCTURAL MEMBERS

[75] Inventor: George L. Satava, Hudson, Ohio

[73] Assignee: Midland Steel Products Co., Cleveland, Ohio

[21] Appl. No.: 826,187

[22] Filed: Aug. 19, 1977

[51] Int. Cl.² ............................................. C21D 1/18
[52] U.S. Cl. ................................. 148/131; 148/143; 148/144; 148/150; 148/153
[58] Field of Search ............... 148/131, 143, 150, 153, 148/144

[56] References Cited

U.S. PATENT DOCUMENTS 3,294,597  12/1966  Kuchera ............................ 148/131

Primary Examiner—R. Dean
Attorney, Agent, or Firm—Fay & Sharpe

[57] ABSTRACT

This invention relates to a method of induction heat treating and restraint quenching structural members, particularly those of low carbon alloy steel (lean content), to a uniform martensitic structure, such that distortion of the member due to rapid quenching is controlled. The members would generally be of a channel shape and they would be heated by induction preheating in several stages to austenitizing temperature, namely 1450° to 1750° F., and then liquid quenching the channel member and restraining the channel on both its web and its flanges to below 900° F. to minimize distortion and then tempering the channel at a temperature of 750° to 1000° F. and again restraining it while cooling to avoid distortion. These would generally be truck side rails and they would be low carbon alloy steels (lean content), approximate carbon content of 0.22–30%, manganese 1.00 to 1.35%, sulfur 0.05% max., phosphorus 0.04% max., with minimum physical properties after heat treating of yield strength 110,000 psi and tensile strength 125,000 psi. The induction preheating is done at about 10,000 cycles. The inductors would be either hairpin coils, oval coils or possibly pancake coils.

21 Claims, 16 Drawing Figures

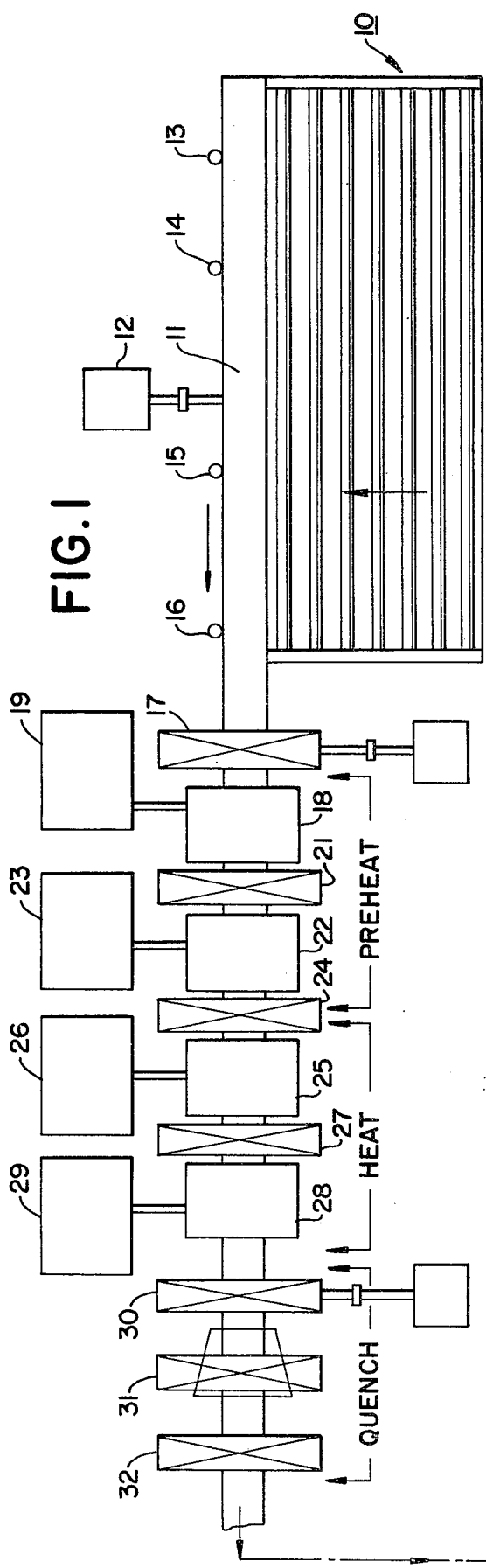
FIG. I
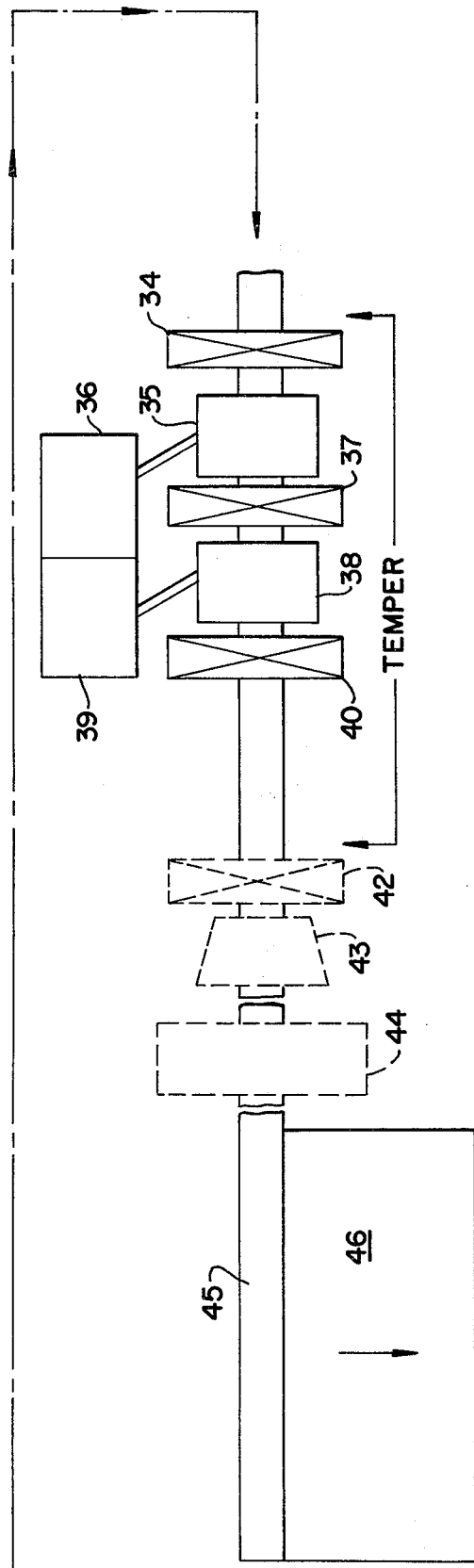
FIG. IA

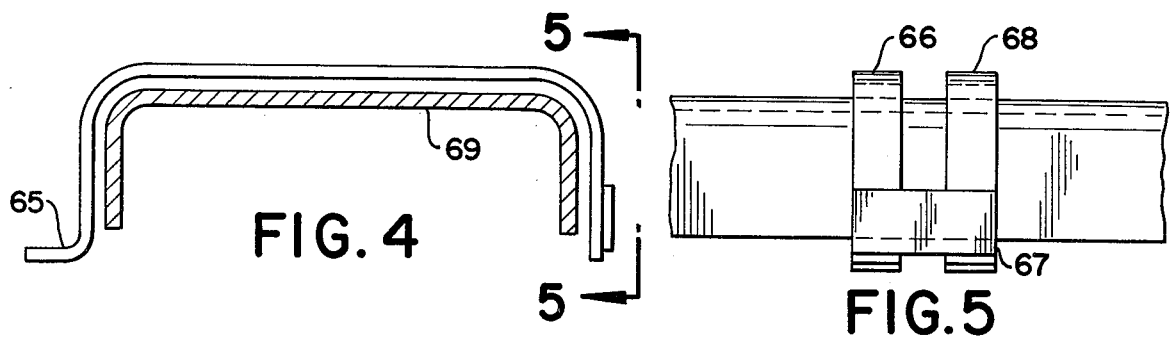
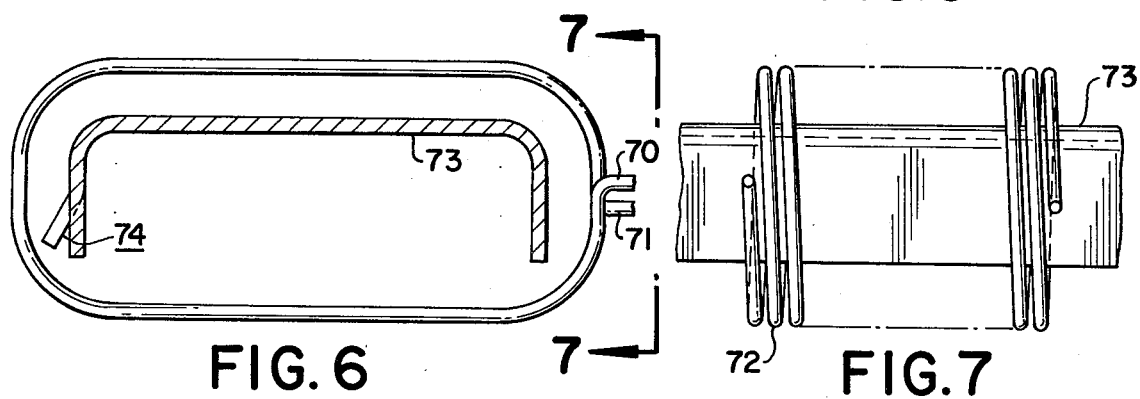
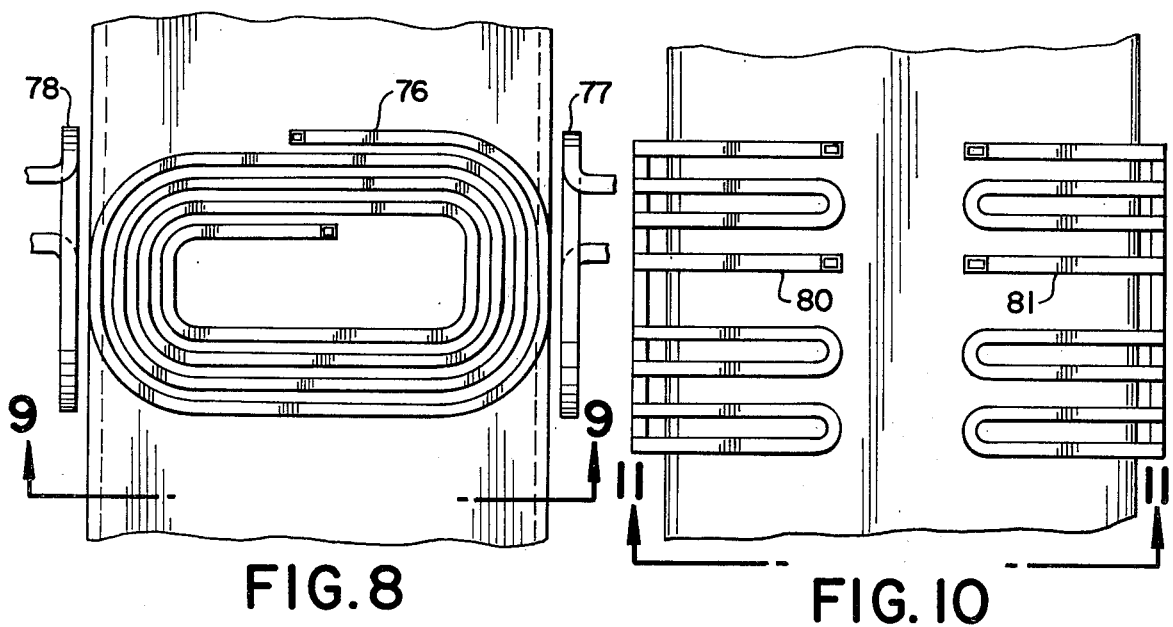
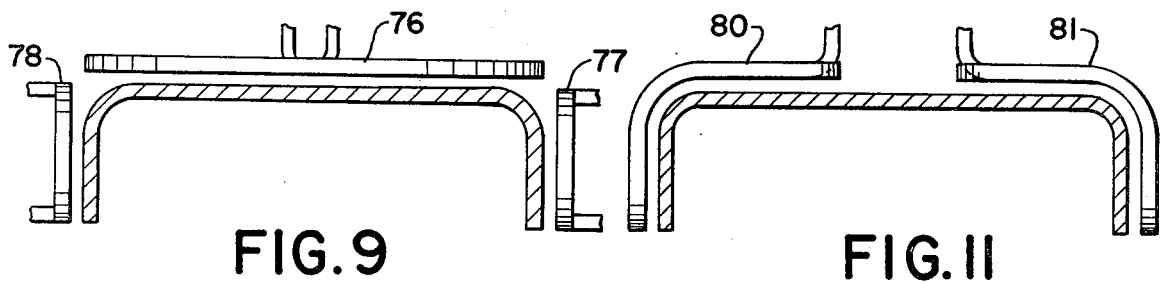

METHOD OF INDUCTION HEAT TREATING, QUENCHING AND TEMPERING, OF STRUCTURAL MEMBERS

BACKGROUND OF THE INVENTION

This invention generally relates to a method of specialized induction heat treating and restraint quenching of structural members which generally are in the shape of a channel but can be any member having a web and at least one flange. The object of this specialized heat treatment would be to produce certain physical properties which are required in the design of truck side rails, as a means of increasing strength of a given side rail section such that the payload capability of a truck is increased with no additional weight penalty in the side rail effecting a more efficient vehicle. Truck side rails are long structural channel members generally 8 to 40 feet in length, 0.250" to 0.375" thick. Due to the lean alloy composition of the low carbon steel specified in this invention, a rapid effective quench is necessary to obtain the required minimum physical properties and microstructure. As the truck side rail is a long, thin section member, generally cold formed into its channel shape from a flat strip, considerable residual stresses are present due to the forming operation. During the heating and rapid quenching of these thin section members, considerable distortion occurs due to the interaction of the residual stresses and the severe thermal action of the quench; distortion is evident in the member as bow, twist, and camber, as well as growth experienced along the length of the side rail due to the material grain size enlargement as a result of the heat treat operation.

This invention further relates to a method of induction heat treating and restraint quenching structural members such that the total system represents a more economical investment than do existing conventional methods of restraint quenching, in particular, restraint quenching truck side rails. These other techniques for restraint quenching truck side rails are taught in the Kuchera U.S. Pat. Nos. 3,252,695 and 3,294,597 in which are employed large movable die quench sections constructed with a vast network of quench fluid passages to simultaneously allow quench fluid passage and provide restraint, such that the overall effect is akin to a large forming press complete with dies, representing a sizeable investment. The method of restraint taught in conventional methods must be elaborate as the entire member is quenched at the same time, setting up significant thermal gradients along the member length, greatly increasing the propensity to distort. This invention does not require the large quench press and its attendant special die sections as relatively short sections of the rail are heated in stages to austenitizing temperature and then immediately restraint quenched on a continuing basis as the member travels longitudinally through the system, necessitating only a relatively short restraint quench system which, in this invention, employs restraint rolls similar to those found in roll forming operations.

It is known generally to produce induction heated, quenched and tempered, high strength steels for tubular products but not necessarily for structural members, more specifically channel members. One method of making these is described by Tom Allan in a paper entitled "Production of High Strength Quenched and Tempered ERW Tubular Products Utilizing Induction Heating Equipment," 13th Mechanical Working and Steel Processing Conference, Jan. 20, 1971, Pittsburgh, Pennsylvania.

Generally others have taught various techniques for rapid heat treating of steel and quenching. Examples of this are R. A. Grange, "The Rapid Heat Treatment of Steel", *Metallurgical Transactions,* Vol. 2, January 1971, p. 65–78. More generally, of course, the induction and flame hardening of metal is known in the *Metals Handbook,* Vol. 2, 8th Edition, "Induction and Flame Hardening", pages 167–202. The particular type of hardening taught in this instance is known as "through hardening." Other developments of bar quenching fixtures are taught in U.S. Pat. No. 3,738,629. Various inductor coil designs are taught in patents, such as U.S. Pat. No. 3,699,302 and page 171 of the *Metals Handbook,* Vol. 2.

SUMMARY OF THE INVENTION

This invention is directed to the selection of a generally low alloy steel using a special heat treat and restraint quench operation to increase the physical properties of the steel so that it will provide favorable strength characteristics for effective truck frame designs. In general, it is contemplated in this invention that a typical low alloy steel will have a steel content of carbon 0.22–30%, manganese 1.00 to 1.35%, sulfur 0.05% max., phosphorus 0.04% max., and this would be expected to have a full martensitic structure after heat treat. These steels are generally known as SAE 1025 or SAE 1027 with increased manganese content. The minimum physical properties after heat treatment would be the yield strength of 110,000 psi minimum and a tensile strength of 125,000 psi. The hardness of this material after completing the tempering would be in the range of 269 to 331 Brinell. The method of heat treating would consist of taking a formed channel member, though it could be other shapes, such as a T, an I-beam or even bars or flats, and rapidly heating and quenching this member by causing it to pass through a series of preheat steps. In these preheat steps, the member is heated up to about 400° in the first preheat step and possibly to 950° in the second preheat and then in one or more steps to a final preheat to austenitizing temperature about 1450° F. to 1750° F. The member is then quenched, in which a large quantity of water is poured frequently at a rate in excess of 1,000 gallons per minute onto all faces of the member and this is then cooled to about 900° to avoid distortion. After quenching, the hardness of this material will be as much as 440 to 460 Brinell. Immediately preceding and immediately following the quench, the member is restrained by passing it through restraining rolls that have a roll on the web, both above and below it, and on the flange members to restrain the web and flange so that they do not distort. Subsequent to the restraining of the member, it is then tempered by again inductively tempering the member to a temperature in the range of 750° to 1000° F. and restraining the member after heating while cooling to avoid distortion by passing it through a set of restraint strands.

The invention is particularly directed to the method and it will be characterized by various inductor shapes which include that of an oval, pancake coil or hairpin coil. Basically, this apparatus and method then provides for rapid induction heating of a member, such as a channel member or truck side rail. It provides a rapid quenching of the section of the workpiece as it travels longitudinally and distortion is minimized by the quenching of a relatively small section at a time as the member travels longitudinally through the line. This position of the quench water being such by means of pressure, flow rates and direction of the water spray so that the distortion is controlled. During quenching and before distortion sets in, the distortion is controlled by incorporation of roll stands which are interspersed in the quenching mechanism and the heating areas if required which, without rerolling the product, restrains the movement of the channel. This is done by having a roll stand effect the web of the channel and by having side rolls to prevent side distortion. This apparatus and method then provides flexibility as it can be adapted through coil design of the inductors, both the preheat and temper inductors, to selectively heat treat a portion of the length of the workpiece or only certain areas of the workpiece which are highly stressed, such as the flanges and the part of the web, as was taught in McNitt, U.S. Pat. No. 3,352,724.

BRIEF DESCRIPTION OF THE DRAWINGS

FIGS. 1 and 1A are schematic views of the entire line showing the preheat, the heat sections, quench and temper sections, as well as the feed roller conveyor and the cooling table;

FIG. 4 is a cross-sectional view through one form of the inductor;

FIG. 5 is a side view of said cross section in FIG. 4;

FIG. 6 is a further cross-sectional view of the modification showing an oval inductor;

FIG. 7 is a side view of said inductor of FIG. 6;

FIG. 8 is a top plan view of a pancake inductor on the web and additional pancake inductors on the flanges;

FIG. 9 is a cross-sectional view of said pancake inductors of FIG. 8;

FIG. 10 is a top plan view of a pancake inductor in an L-shape, leaving an open section substantially unheated;

FIG. 11 is a cross-sectional view of said L-shaped pancake inductors of FIG. 10;

DESCRIPTION OF THE PREFERRED EMBODIMENTS

Figure 2:
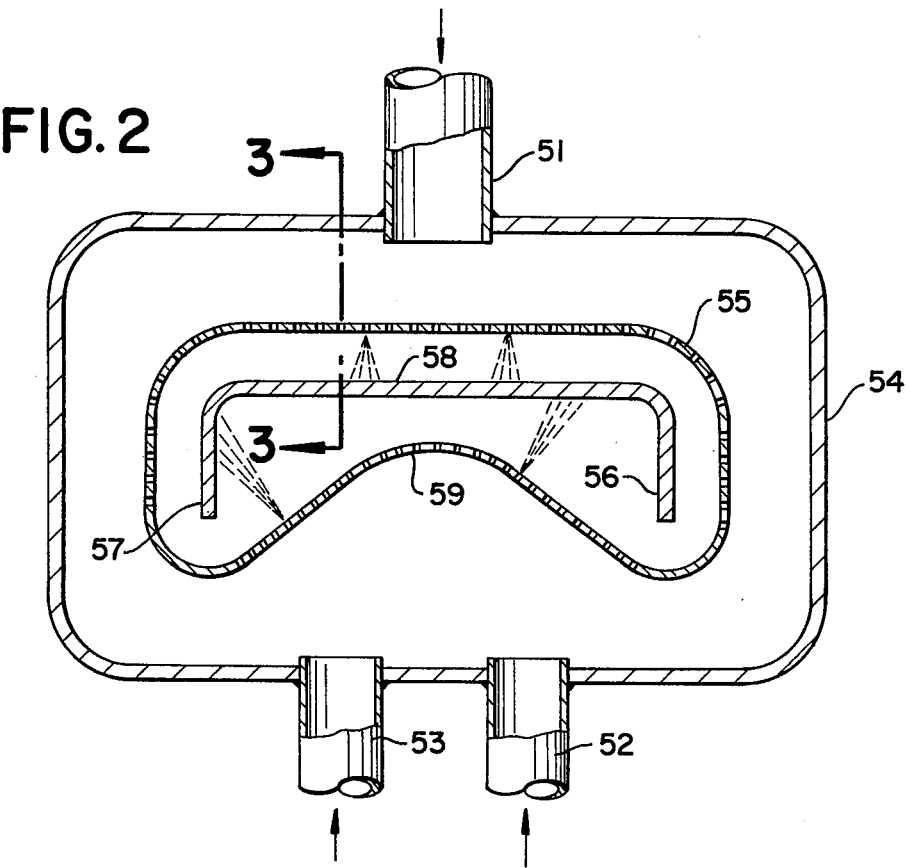
FIG. 2 is a cross-sectional view through the quench section.

FIG. 1 and FIG. 1(A) are an overall plan view of this preheat, quench, temper line for truck side frame rails. 10 shows generally the roller conveyor and loading table on which long channel shaped members would be fed to the line. These channel shaped members would be 9⅜" on the outside of the channel to as much as 12¼" on some very large channels. Each leg of the channel would be 3" to 4" and would generally be of stock up to ⅜" and more frequently in the range of 0.250" to 0.312". This would then pass to the conveyor line itself 11, which is driven by a drive unit 12. Various guide rollers for the conveyor are shown at 13, 14, 15 and 16. Some of these truck side rails are as long as 40 feet. These then pass through a pinch and guide roller shown generally at 17. It is more particularly seen in FIG. 12. Providing heat for the first preheat stage which would be an inductor producing power at possibly 180 cycles to as much as 3,000 cycles and would heat the channel member up to approximately 400° F. This is seen in the first inductor at 18 and the inductor power supply seen at 19. We then go to a second stage of pinch and guide rolls, one of which is shown at 21, and the second inductor would be 22 and its power supply would be 23. At this stage the channel would be heated to approximately 950° F. To the final heat stage which could be one or more stages, we see a pinch and guide roll of the type shown in FIG. 12 at 24 and an inductor 25 which now may be of higher frequency, possibly 10,000 cycles and its power supply is seen at 26. The other pinch and guide roll is seen at 27 and a further inductor is seen at 28 and its power supply at 29.

Figure 14:
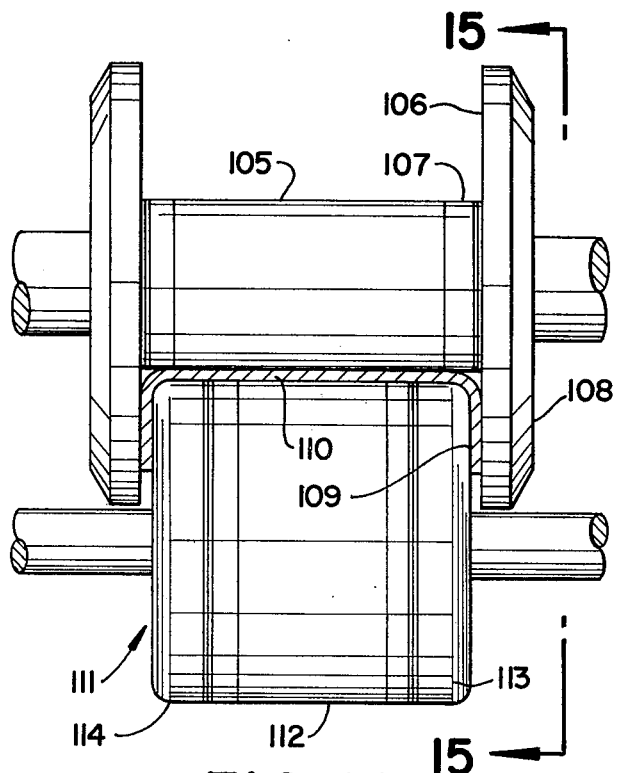
FIG. 14 is a view of the restraining rolls that are used upon quenching of the channel to restrain movement of the flanges, both inwardly and outwardly.
Figure 15:
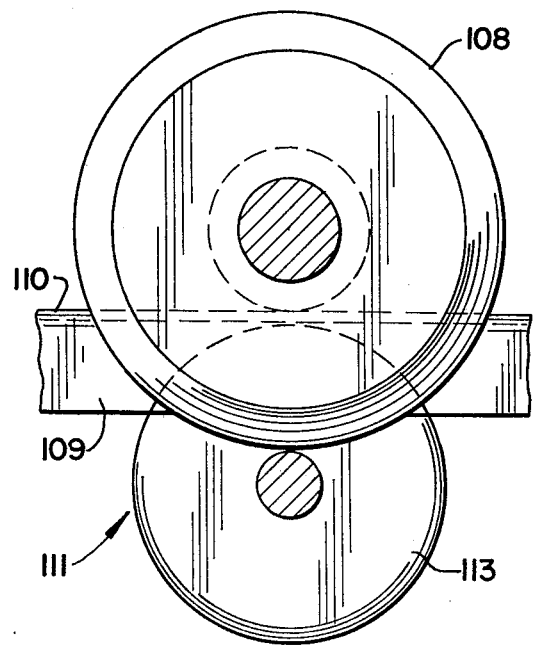
FIG. 15 is a side view of said restraining rolls shown in FIG. 14.

The temperature of the channel has now been raised to about that of the austenitizing temperature 1450° to 1750° F. These now pass to the first of the restraint and roll stands, the first one of which is seen at 30 and the cross section of which is seen in FIGS. 14 and 15. Immediately following this is the quench section seen generally at 31 which will be described in connection with FIG. 2 and a further restraint and roll stand 32, the type shown in FIG. 14.

Next follows the temper section in which we have a restraint and roll stand 34 and the first inductor 35 with its power supply 36. The inductor for the temper section may be in a series of stages so we have shown another restraint roll stand 37, an inductor 38 in the second stage and its power supply 39, and a final restraint roll stand 40. This then passes to the temper quench which may be necessary. Sometimes it is planned to air cool the channel members but if it is necessary, then we would have a restraint roll stand 42, a possibly liquid quench 43 of the type shown in connection with FIG. 2 and a final mill straightening roll which is shown diagrammatically at 44, the type shown in FIG. 14. There might be as many as three straighteners at this point. Finally, the channel member passes to the last conveyor table 45 and is pushed aside to the cooling table 46. In connection with the specific features of the invention, the quench section is probably the most critical.

Specifically, FIG. 2 shows the quench which is shown in connection with FIG. 1. We would have a multiplicity of water supplies which the upper one would be shown at 51 and a pair of lower supplies at 52 and 53 would generally be a housing member of rectangular cross section at 54 and inside this would be a perforated member shown generally at 55, having apertures approximately ⅛" in diameter that are angled toward the direction of movement and that impinge on all surfaces. They are seen, for example, impinging on the right flange as seen at 56 and the left flange as seen at 57, besides the web which would be seen at 58. Additionally, the inside flanges opposite these flanges would be covered by the lower section of the quench shown generally at 59. Over 1,000 gallons per minute would pass onto the channel member so that it would be evenly quenched in a very few seconds. The spacing and size of the apertures shown generally at 55 and 59 will vary such that the amount of quench water impinging on a given area of the channel will tend to control the distortion developing from the quench process. Also, the amount of incoming water supplies at 51, 52, and 53 can be varied during operation to further effect distortion control by directing more or less quench liquid to either outside or inside of web, channel right or left sides to control distortion such as bow and camber. The object is to get the temperature of the channel down to below 900° F. and minimize distortion in the restraint roll stands that follow. Generally the web would be up and the flanges depending.

Figure 3:
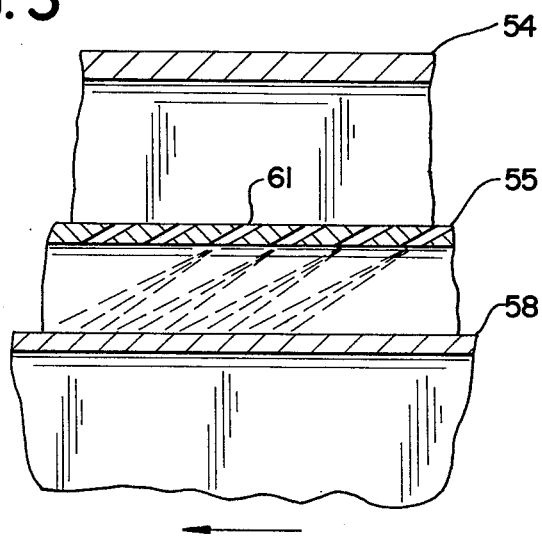
FIG. 3 is a longitudinal cross section through the quench apparatus.

FIG. 3 shows the cross section along the line 3—3 of FIG. 2 and shows the housing member 54 and the inner housing 55 having apertures, one of which is shown at 61 therein and these are proejcted at about a 30° angle to the channel member so that the water is carried away along the direction of movement of the channel. The web of the channel itelf is shown at 58.

Figure 12:
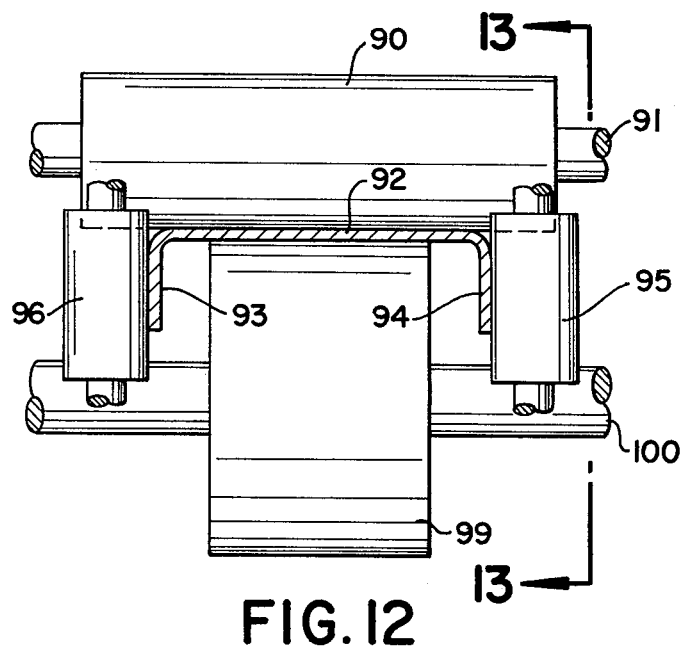
FIG. 12 is a cross-sectional view of the pinch and guide rolls of this invention.
Figure 13:
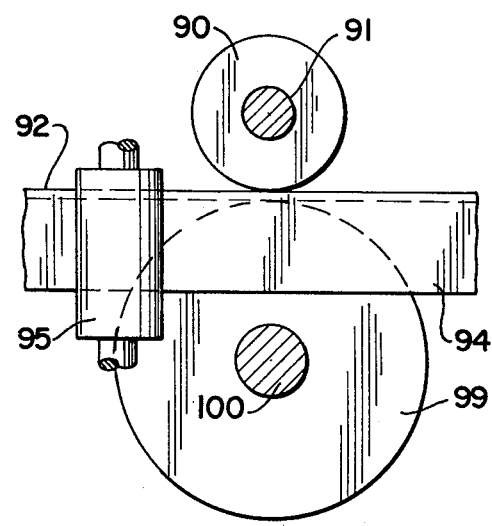
FIG. 13 is a longitudinal view of the rolls of FIG. 12.

FIG. 4 shows a typical type of loop inductor that has connections coming in at 65 and a single loop having a first member 66 extending across the channel, a connecting link 67 and a return loop 68. This would induce currents into the channel member shown generally at 69 and heated up to the appropriate temperature. A varient form of inductor is shown in FIG. 6 and the difference is that it is an oval inductor having a pair of input connections as seen at 70 and 71 and a multiplicity of loops which are shown generally at 72. It can be seen that these are in close proximity to the channel member 73 and in this case the channel differs in that it might be bowed outwardly as seen at 74 because certain truck side rails have to be bowed over a confined area to permit mounting of certain components, such as an engine and the like, and adequate clearance is provided on the side so that varying shapes of channel members may be fitted through the line. The proximity of the coil to the channel member will be determined by the amount of bow out in the member and the attainment of a uniform heating pattern in the member. FIG. 7 shows a side view of this multi-turn oval coil that would be used in connection with this invention. FIG. 8 is a pancake coil having in connection with this view, as seen at 76, a single loop in the shape of a pancake, possibly rectangular in shape though, covering the web of the channel. Another loop is seen at 77 which would cover one flange and a further loop at 78 which would cover the other flange. The main object of all three of these coil assemblies is to produce even heating without excessively raising the temperature of the channel member in any portion of the channel so that the austenitizing temperature can be reached as exactingly as possible without damaging the metallurgical structure of the steel. FIGS. 10 and 11 show an L-shaped pancake coil. In this instance the left pancake coil 80 is L-shaped and surrounds both the web and the flange. The right pancake coil 81 surrounds both the web and the flange, leaving a gap of many inches between the coils because this will be a portion of the channel which on end will have the neutral axis passing through it and the stresses will be of lower order of magnitude. The reasons for this structure are shown in McNitt U.S. Pat. No. 3,352,724, which are incorporated in here by reference. Now as to the various pinch and guide rolls, FIG. 12 shows a view of these. 90 shows the top pinch roll moving and 91 diagrammatically shows the axis of such pinch roll. The channel member itself is shown at 92 having flanges 92 and 94. Guiding the flanges would be web idlers shown at 95 on the right, 96 on the left. The lower pinch roll is shown at 99 about its center 100 and it would adapt to pinch the channel member 92 between the upper pinch roll 90 and the lower pinch roll 99.

FIG. 14 shows a view of the restraint rolls. The upper restraint roll generally shown at 105 has a flange member 106 with a series of spacers between the roll 105 and the flange 106, one of which is shown at 107. This adapts it to webs of any width, as well as allowing adjustment to suit the growth of a "hot" section as would be the case at stand 30 compared to a "cold" or quenched section as would be the case at stand 32 to further effect distortion control, and has a flange portion 108 which restrains the lateral movement of the flange shown generally at 109. The web of the channel is shown at 110. The lower roll is shown generally at 111, having a center portion 112 and variable sized right and left-hand roller portions 113 and 114. This equips the roll to fit various size channels and it will be seen that in movement of the rolls, the channel will be restrained both on its web 110 and on its flange as at 109, so that it cannot buckle or distort. This was described in connection with the schematic diagram of the induction heating, quench and tempering line. After the channel member becomes hot, it would generally be restrained in order to keep the flanges and the web straight. During the initial section it would be guided through the inductors until it reached a temperature at which the residual stresses would be relaxed such that the section would warp.

Generally, in connection with this invention, the preheating takes place in a number of steps and the inductors would be designed with the frequency that would produce the greatest heat efficiency. Most probably the lower temperature preheat coils would be about 180 cycles or multiples thereof up to a maximum of 3,000 cycles. In the final preheat stage, probably a 10,000 cycle coil would be used to heat the member to austenitizing temperature. On one design we intend to revert to 180 cycles for the final heat, although a range of 180 to 3,000 cycles could be employed. In the temper inductors, the frequency might be 180 to as much as 3,000 cycles to reheat the channel up to 750° to 1000° F. to temper the channel member. It is generally recognized that the frequency selected in the preheat, austenitizing and temper will depend upon the size of structural section processed to achieve optimum heat efficiency. It is the intent of this invention to utilize dual frequencies in the preheat, austenitizing, and tempering phases as determined necessary to obtain that optimum heating efficiency for the required production rates.

One of the particular problems in connection with heat treating, quenching and tempering channel members is that they both bow and twist and besides there will be camber. These are conditions that generally exist in the metal in the cold state as received from the steel mill which manifest themselves as residual stresses in the formed part, plus additional residual stresses added as a result of the cold forming of the member, which are relaxed in the thermal cycle of the heat treatment process such that distortion occurs; in effect, the steel has a "memory" and it will tend to revert to its relaxed condition.

It is a further object of this invention that adjustments must be made to a truck side rail which has portions of the flange removed at points of lower stress. This is, of course, in keeping with typical struck side rails as cutouts are also required to provide clearance for certain components such as the engine. It is planned that in heating these truck side rails by induction heating, in order to avoid localized overheating in the lesser sections of the member where the flange has been removed, means can be provided such that the amount of current passing through any section of the channel shall be proportional to the cross section of the member in said section. This means that the inductors would have to be programmed to change along the length of the product as it was going through the line. It is further contemplated that, in general, the rapid movement of the structural member with respect to the induction preheating and austenitizing limits the overheating that might take place in connection with the induction heating and tempering stages.

Having thus broadly explained the concepts of my invention, what I wish to claim is appended as follows but I do not mean my invention to be limited anything more than by the claims of this case.

What is claimed:

1. A method of induction heat treating and quenching a structural member of low carbon alloy steel to a uniform martensitic structure, said member having a web and at least one flange substantially perpendicular thereto which consists of:
   (a) Induction preheating to 900° F. approximately in at least one step;
   (b) Continuing the induction preheating to austenitizing temperature in the range of 1450° to 1750° F. while avoiding localized overheating;
   (c) Liquid quenching the member with a multiplicity of nozzles immediately, said nozzles being disposed and regulated to minimize distortion;
   (d) Restraining both the member web and flange in progressive contour roll stands to below 900° F. to minimize distortion sequentially and in close proximation to the quenching operation;
   (e) Induction tempering the member to a temperature in the range 750° F. to 1000° F.; and
   (f) Again restraining the member while cooling to avoid distortion by passing the member through a set of roll forming stands.

2. The method of claim 1, in which the structural member is a channel.

3. The method of claim 1, in which the structural member is a truck side rail.

4. The method of claim 1, in which the low carbon alloy steel has the following composition: carbon 0.22–30%, manganese 1.00 to 1.35%, sulfur 0.05 max., phosphorus 0.04 max., with minimum physical properties after heat treating of yield strength 110,000 psi and tensile strength 125,00 psi.

5. The method of claim 1, in which the low carbon alloy steel is an approximate SAE 1025 or 1027 with greater amount of manganese approximating 1.00 to 1.35%.

6. The method of claim 1, in which the hardness after tempering reaches 269 to 331 Brinell.

7. The method of claim 1, in which preheating is done with induction heating at 3,000 cycles or less.

8. The method of claim 7, in which the preheating is done with induction preheating at 180 cycles or less.

9. The method of claim 1, in which it is induction preheated to 900° F. firstly at 3,000 cycles or less and the further preheat to austenitizing temperature is done at 180 cycles or less.

10. The method of claim 1, in which the preheating to austenitizing temperature is done at 10,000 cycles or less.

11. The method of claim 1, in which the induction tempering is done at 3,000 cycles or less.

12. The method of claim 1, in which all the induction preheating and induction tempering is done by induction heating in a shaped coil that approximates the structure of the part in question.

13. The method of claim 12, in which the induction heating coil is a hairpin coil.

14. The method of claim 12, in which the coil is an oval coil.

15. The method of claim 14, in which the structural member is a channel, with the web of the channel up and the depending flanges down and the oval surrounding the channel in its longest dimension.

16. The method of claim 1, in which a pancake coil is used for induction heating the flange and the web member.

17. The method of claim 16, in which a separate pancake coil is used for the web and another coil for the flange.

18. The method of claim 17, in which an L-shaped pancake coil is used to heat the web and the flanges simultaneously.

19. The method of claim 18, in which an L-shaped pancake coil is used to heat each flange and a portion of the web with the center portion of the web being substantially unheated.

20. The method of claim 1, in which the structural member is a truck side rail having portions of the flange removed at points of lower stress and the heating steps are by induction heating with the amount of current passing through any section being in proportion to the cross section of metal in said section in order to avoid localized overheating in the thinner sections of metal where the flanges have been removed.

21. The method of claim 20, in which the speed of the structural member with respect to the induction preheating limits the overheating of the member.

* * * * *